J. W. BICKEL.
METER.
APPLICATION FILED JAN. 28, 1921.

1,391,093. Patented Sept. 20, 1921.
2 SHEETS—SHEET 2.

Witnesses:
Harry R. L. White
W. P. Kilroy

Inventor
Joseph W. Bickel.
By Brown Borthen Denns
Attys.

UNITED STATES PATENT OFFICE.

JOSEPH W. BICKEL, OF CHICAGO HEIGHTS, ILLINOIS.

METER.

1,391,093.  Specification of Letters Patent.  Patented Sept. 20, 1921.

Application filed January 28, 1921. Serial No. 440,644.

*To all whom it may concern:*

Be it known that I, JOSEPH W. BICKEL, a citizen of the United States, residing at Chicago Heights, in the county of Cook and State of Illinois, have invented a certain new and useful Improvement in Meters, of which the following is a full, clear, concise, and exact description, reference being had to the accompanying drawings, forming a part of this specification.

My invention relates to meters, and more particularly to the type of meters known as "maximum demand meters" for measuring the maximum rate at which current is drawn by a consumer.

This invention deals with the matter of testing or checking the accuracy of meters of this type or any other type by a substitutional method. In meters of the type above mentioned, as now manufactured and marketed, particularly by the General Electric Company, a circular paper chart is rotated under a recording stylus or needle by a clock mechanism. The stylus is stepped up from zero by a pawl and ratchet mechanism which is actuated by a magnet energized each time that a contact is made in a watt hour meter. At the end of a predetermined period, the clock mechanism disconnects the stylus arm from the pawl and ratchet mechanism and the stylus arm drops back to zero. The central part of the chart serves as zero, and due to the friction of the stylus upon the chart and the crowded character of the zero line, it is hard to establish a definite and invariably correct zero line. Hence, the meter is checked not at the zero line, but at a line a certain distance above zero such, for instance, as the line corresponding to twenty units or steps. In order to test the correctness of the setting of the stylus with respect to the chart, or vice versa and to check the operation of the meter, the needle is advanced by twenty steps which are secured by energizing the magnet twenty times whereupon the needle or stylus should register with the gaging or calibrating line on the chart. In order to do this, I have provided the meter with a special means for substituting for the normal operating force a known force or effort to the stylus arm and the means for operating it, so as to advance said stylus arm to the predetermined position which should correspond with the calibrating line of the chart. In the specific illustration of my invention which I shall describe later, I have provided a meter of this character with a special contact device which obviates the disconnection of the regular connections of the meter and which is normally inclosed under the cover of the instrument to impart a predetermined number of impulses to the stepping magnet or other advancing means of the stylus for bringing it to the predetermined position. This switch is normally inaccessible since the cover of the meter is locked in place, so that accidental or mischievous actuation of the same cannot be accomplished and the switch is accessible only to an authorized agent of the service company or owner of the instruments.

The invention is to be applied not only to maximum demand meters, but may extend to all other types of meters where it is desired to check the operative character or adjustment of a meter.

In order to acquaint those skilled in the art with the manner of constructing and practising one form of the invention, I shall now describe a specific embodiment of the same in connection with the accompanying drawings.

Figure 1:
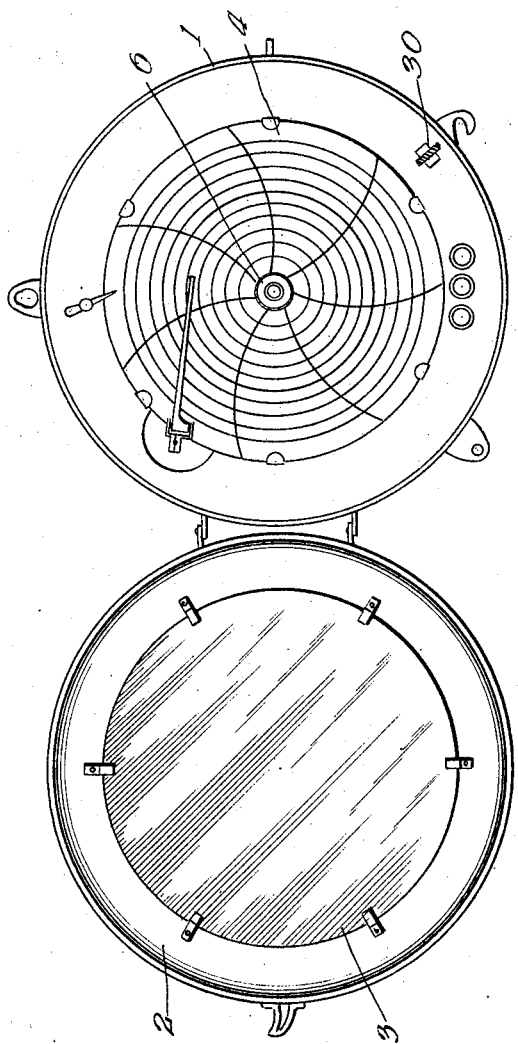
Figure 1 is a front elevational view with the covers swung to open position of a maximum demand meter employing my invention.

The particular style of meter to which my invention is shown as applied is known as the type G—3 demand meter of the General Electric Company and illustrated in its Bulletin No. 86104—B, published December 1918.

The meter comprises a casing 1 having a hinged cover 2 which hinged cover has a glass 3 through which the chart 4 is visible. This chart 4 is driven by a clock mechanism 5 which has the central shaft 6 to which shaft the chart 4 is connected whereby said chart is advanced in a rotary direction at a uniform rate.

A stylus arm 7 bearing at its outer end a stylus 8 is adapted to make a record on the chart 4, this arm being advanced through a stepping magnet 9 and suitable transmission mechanism 10. This transmission mechanism includes a pawl 11 and a circular ratchet 12 which ratchet is held against retrograde movement by a holding pawl not shown. The pawl 11 is mounted on the end of an armature member 13 in such position as to be actuated by energization of the magnet 9. The magnet is periodically energized by closing of its circuit at the contacts 14 which are closed by a suitable cam wheel 15 mounted in the watt hour meter 16. For the registration of a predetermined unit on the watt hour meter 16, the contacts 14 will be closed energizing the magnet 9 and causing a predetermined advance of the stylus arm 7, this advance depending upon the ratio of the intermediate gearing. The circuit of the magnet 9 includes a suitable source of current shown in this case as being connected through a transformer 17 over the wires 18 and 19. The wire 19 is connected to one of the contacts 14, the other contact being connected by way of the wire 20 through the magnet 9 and wire 18 to the source of current.

The meter is provided with a connecting block 21 to which the wires 18 and 20 are connected, and this block contains a contact for a third wire 22 for connection with the wire 19 leading to the source of current. A thermostatically controlled heating device 26 is connected over the wires 27 and 28 to the source of current 17 through the terminals 24 and 25 on the connecting block 21. This, however, forms no part of the present invention.

Figure 2:
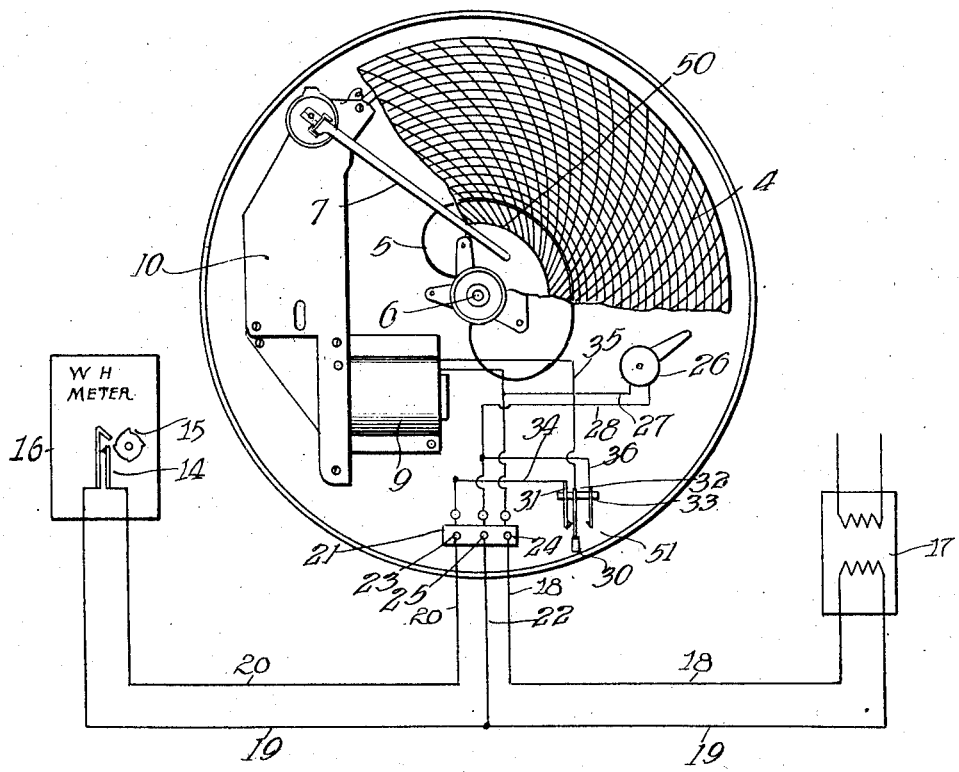
Fig. 2 is a diagrammatic illustration of the operating parts of the meter with the device of my invention applied thereto.
Figure 3:
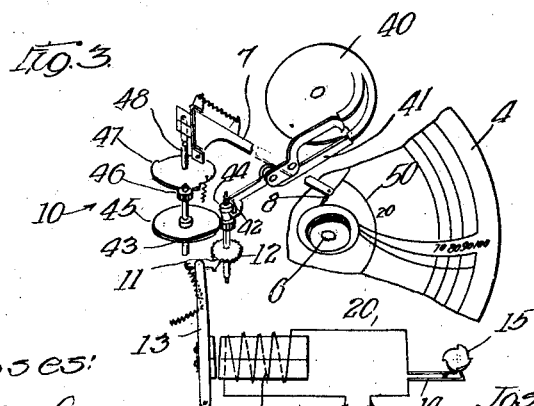
Fig. 3 is a diagrammatic illustration, showing certain of the operating parts in perspective for explaining the operation of the meter.

I have provided a manually operable switch member 30 containing the normally closed contact 31 and 32 through which the circuit of the magnet 9 is normally made by way of wires 34 and 35. A third switch contact 33 which is normally open but which is adapted to engage with the contact 32 when the handle 30 is moved to the right, as shown in Fig. 2, is connected to the wire 22 by way of wire 36.

The clock mechanism which advances the chart contains a cam wheel 40 which is connected through an escapement or follower mechanism 41 to a releasing form 42 which releasing fork is adapted to raise the pinion 43 through a collar 44 to disconnect the pinion 43 from the gear wheel 45, which gear wheel 45 is connected to turn through a pinion 46 and gear sector 47 to the shaft 48 of the stylus arm 7.

The chart 4 is provided with various graduations extending out in a generally radial direction, but struck in the form of suitable arcs for coöperation with the stylus arm 7. The central part of the chart is clamped under a suitable clamping nut fastened to the shaft 6, so that the chart will rotate with said shaft. The chart is graduated from zero, a circular line close to the center of the chart, outwardly toward the periphery of the chart. At a point a suitable distance away from the zero line, is selected the calibrating line 50 which in this case corresponds to the position of the stylus when it has correctly registered twenty steps (or a suitable multiple thereof) of the arm 7. Any other calibrating line might be chosen, but I find the above to be convenient.

The operation of the device is as follows:
The watt hour meter registers the power taken by the consumer, and as the watt hour meter advances, the cam wheel 15 will cause opening and closing of the contacts 14 with the registration of a suitable unit upon the watt hour meter. For each energization of the magnet 9, the stylus arm 7 will be advanced a predetermined degree depending upon the ratio of the intermediate gearing. The clock mechanism 5 drives the chart 4 forward at a relatively slow rate of speed, but in a uniform manner, and at the same time, the clock mechanism drives the cam member 40 so that at the end of a half hour period, the pinion 43 is disconnected from the gear 45 and the stylus arm 7 drops of its own weight back to zero. Obviously, the position of the stylus, whether it is accurately upon zero or not, is immaterial, but it is important that the real indicating part of the chart which indicates the amount of current used during the period of time should be accurately indicated by the stylus. In order to check the operation of the meter to see that the stylus actually is correctly registering, I have provided the checking switch 51 having the handle member 30 which is first moved to the right to break the circuit of the watt hour meter and which may then be moved farther to the right to make contact with the spring contact 33 for imparting impulses to the magnet 9. To check the meter, the switch is first moved to the right far enough to break the normal circuit of the magnet 9 and then contact is made between the springs 32 and 33 twenty times in order to impart twenty stepping impulses to the magnet 9, whereupon the stylus 8 should register with the line 20 on the chart.

I have provided this switching device 51 within the casing 1 under the cover 2, so that when the cover is locked on the casing as it normally is, the switch will be inaccessible and consequently, cannot be tampered with. I do not intend to limit the invention solely to the location of this switch within the casing of the meter and do not intend to limit the invention to the precise details of construction shown and described, nor in fact, do I intend to limit this invention solely to maximum demand meters.

I claim:
1. In a meter, a rotary chart, a stylus arm adapted to advance from adjacent the center of the chart toward the periphery of the chart, said chart having a graduating line a predetermined distance out from the zero line, and a manually controlled means for applying a known movement to said stylus to move it a definite distance outwardly from zero which distance should bring the stylus to said graduating line.

2. In a meter, a chart, a stylus adapted to make its graph on said chart, means for advancing said stylus, said chart being provided with a definite graduating point for checking the operation of the meter, and means for applying a force to said advancing means for checking the operation of the meter with respect to said chart.

3. In combination, a chart, a pointer co-operating with the chart, an actuating element for the pointer, and means for applying a force to said actuating means for checking the correct operation of the meter.

4. In a meter, a graduated chart having a checking graduation, a pointer, advancing means for the pointer, and manually controlled means for operating said advancing means a predetermined amount to bring the pointer upon the checking graduation.

5. In a recording meter, a graduated chart having a checking graduation, a stylus, a stepping magnet for advancing the stylus, a circuit and a manually controlled switch for independently actuating said stepping magnet a predetermined amount to bring the stylus to a predetermined position which should coincide with said checking graduation.

6. In a maximum demand meter having the usual operating parts comprising a stepping magnet, a circuit for the magnet containing a source of current, and a meter contact, the combination with means for disconnecting said meter contact and closing the circuit through the magnet directly for checking the operation of the meter.

In witness whereof, I hereunto subscribe my name this 25th day of January 1921.

JOSEPH W. BICKEL.